Patented June 30, 1931

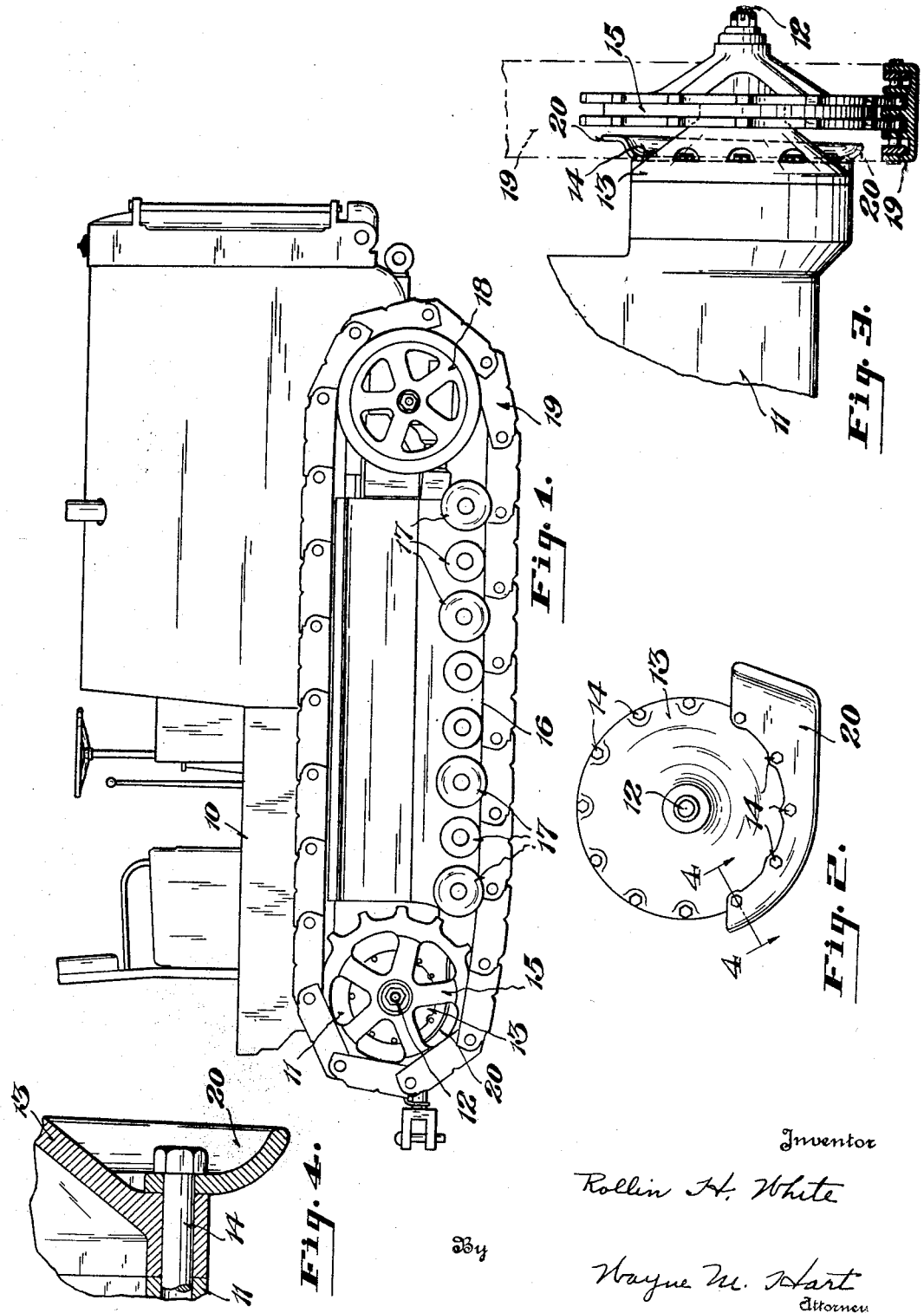

1,812,543

UNITED STATES PATENT OFFICE

ROLLIN H. WHITE, OF CLEVELAND HEIGHTS, OHIO

TRACTOR

Application filed March 17, 1930. Serial No. 436,556.

This invention relates to tractors, and more particularly to tractors of the track laying type.

In the operation of track laying tractors over stony ground, it is not uncommon for the endless track belts to pick up stones of relatively large size and throw or drop them so that they strike the transmission housing, adjacent the driving sprockets, with sufficient force to crack the metal. It is also not uncommon for the endless track belt to carry stones up from the ground and release them between the driving sprockets and the adjacent transmission housing so that they become wedged there between, and thus either prevent transmission of power or cause breakage of either the housing or the drive mechanism.

An object of the invention is to obviate the above mentioned conditions with track laying tractors.

Another object of the invention is to provide a tractor transmission with a shield so that loose stones will not cause breakage thereof.

A further object of the invention is to provide a track laying tractor with a shield which is arranged so that stones and similar hard materials can not become lodged between the transmission housing and the adjacent endless tracks.

Other objects of the invention will appear from the following description taken in connection with the drawings, which form a part of the specification, and in which:

Figure 1 is a side elevational view of a track laying tractor illustrating the position of one of the shields therewith.

Figure 2 is a side elevation of a portion of the transmission housing with a shield attached thereto.

Figure 3 is a plan view of a portion of the tractor with the track broken away to illustrate the relation of one of the shields with the transmission housing.

Figure 4 is a sectional view taken on line 4—4 of Figure 2.

Referring now to the drawings by characters of reference, 10 represents generally the main portion of a tractor which includes a motor, chassis, and transmission and steering mechanism. In the chassis there is a rear transmission housing or cast casing 11 through which similar driven axles 12 extend on each side, only one being shown. A cover plate 13 is secured by bolts 14 to each open end of the transmission casing through which the axles extend and a double sprocket or drive wheel 15 is fixed to the projecting end of each axle.

A supporting and propelling structure is arranged on each side of the chassis. Such structures are conventional and include a frame 16, which is pivoted to the chassis or fixed thereto, roller members 17 carried by the frame, a front idler sprocket 18 and an endless articulated track 19. The track extends around the frame, the front and rear sprockets and beneath the rollers, and is driven by the drive sprocket 15.

When the tractor is traversing stony ground there are several conditions which exist which cause breakage. Movement of the track will sometimes cause stones to become wedged between the cover plates 13 and the adjacent sprockets 15, so that the tractor either stalls, crushes the cover plate, or breaks some part of the transmission or driving mechanism. Sometimes stones will be thrown against the cover plates 13 with sufficient force to crack them due to the power of the drive and the articulation of the members forming the tracks.

In order to obviate such undesirable conditions I propose to provide means for eliminating the possibility of stones being thrown or lodged in the manner above related. To this end I provide a shield 20 for protecting each transmission casing cover which extends adjacent the ground and intermediate each cover and its adjacent sprocket 15. The guards are preferably provided with holes so formed that some of the bolts which secure the covers to the transmission housing can pass therethrough to rigidly fix them to the covers.

The guards project below the covers and curve outwardly so that their free edges project well within the vertical planes of the adjacent endless tracks. The degree of lateral extension of the guards is sufficient to prevent stones, of large enough size to cause damage, from moving upwardly between the cover plates and the drive sprockets. Furthermore, the guards extend forwardly from the cover plate and laterally of the adjacent track so as to deflect stones inwardly of the tractor and away from the tracks.

It will be seen that the guards serve to deflect stones propelled by the track and also will prevent the wedging of stones between the transmission casing and the drive sprockets, so that breakage of the housing and the transmission is thereby eliminated.

Although this invention has been described in connection with a certain specific embodiment, the principles involved are susceptible of numerous other applications which will readily appear to persons skilled in the art, and the invention is therefore to be limited only as indicated by the scope of the appended claims.

Having described my invention what I claim as new and desire to secure by Letters Patent is:

1. In a track laying tractor, a transmission casing having a laterally extending axle supporting portion, an endless track driven in proximity to the laterally projecting portion of the casing, and a shield depending from and extending forwardly of the laterally projecting portion of the casing, said shield lying in a portion of the plane of the track.

2. In a track laying tractor, a transmission casing through which an axle extends, an endless driven track adjacent the casing, a cover plate for the casing, a shield extending laterally from the lower portion of the cover plate, and detachable securing means attaching the shield to the cover plate and the cover plate to the casing.

3. In a track laying tractor, a transmission casing, a driven axle extending from the casing, a sprocket fixed to the projecting end of the axle, an endless track extending around the sprocket, and a shield extending laterally from the casing to a plane adjacent the sprocket and over a portion of the ground run of the track.

In testimony whereof, I hereto sign my name.

ROLLIN H. WHITE.